(12) United States Patent
Kim et al.

(10) Patent No.: US 6,729,771 B2
(45) Date of Patent: May 4, 2004

(54) PARALLEL OPTICS SUBASSEMBLY HAVING AT LEAST TWELVE LENSES

(75) Inventors: Brian Kim, Fremont, CA (US); Lee L. Xu, Cupertino, CA (US); Hengju Cheng, Mountain View, CA (US); Darren Crews, Cupertino, CA (US); Jesse Chin, Hillsborough, CA (US)

(73) Assignee: Stratos Lightwave, Inc., Chicago, IL (US)

( * ) Notice: Subject to any disclaimer, the term of this patent is extended or adjusted under 35 U.S.C. 154(b) by 115 days.

(21) Appl. No.: 10/024,273

(22) Filed: Dec. 17, 2001

(65) Prior Publication Data

US 2003/0113071 A1 Jun. 19, 2003

(51) Int. Cl.[7] ............................................... G02B 6/36
(52) U.S. Cl. ............................................ 385/76; 385/93
(58) Field of Search ............................. 385/93, 76, 92, 385/89, 55

(56) References Cited

U.S. PATENT DOCUMENTS

| | | | |
|---|---|---|---|
| 5,499,311 A | 3/1996 | DeCusatis | 385/89 |
| 5,548,677 A * | 8/1996 | Kakii et al. | 385/92 |
| 5,574,814 A | 11/1996 | Noddings et al. | 385/90 |
| 5,611,013 A | 3/1997 | Curzio | 385/89 |
| 5,768,456 A | 6/1998 | Knapp et al. | 385/49 |
| 6,056,448 A | 5/2000 | Sauter et al. | 385/92 |
| 6,130,979 A | 10/2000 | Isaksson et al. | 385/89 |
| 6,137,929 A | 10/2000 | Rosenberg et al. | 385/31 |
| 6,203,212 B1 | 3/2001 | Rosenberg et al. | 385/92 |
| 6,250,820 B1 | 6/2001 | Melchior et al. | 385/89 |

* cited by examiner

Primary Examiner—Chandrika Prasad
(74) Attorney, Agent, or Firm—Karl D. Kovach

(57) ABSTRACT

A subassembly for use in fiber optic communications systems where multiple optical fibers are used in either transmitting or receiving optical signals. The subassembly is adapted for being mechanically and optically connected with a ferrule supporting a set of optical communications fibers. The subassembly uses a carrier assembly to support an optoelectronic device having a corresponding set of photoactive components which are operative for either converting photonic signals to electrical signals (in a receiver) or converting electrical signals to photonic signals (in a transmitter). The subassembly includes a lens and alignment frame having a set of guide pins and an array of lenses for interfacing the fibers of the ferrule with the photoactive components of the optoelectronic device on the carrier assembly. The carrier assembly may also include signal processing devices and a circuit board having an edge connector for removably connecting the subassembly with a computer or communications system.

4 Claims, 8 Drawing Sheets

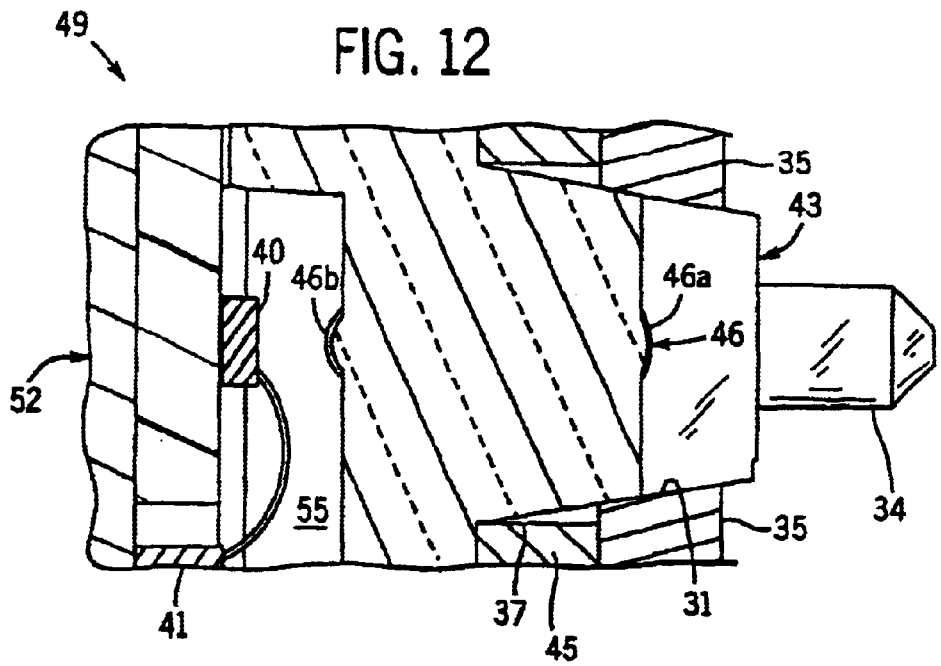
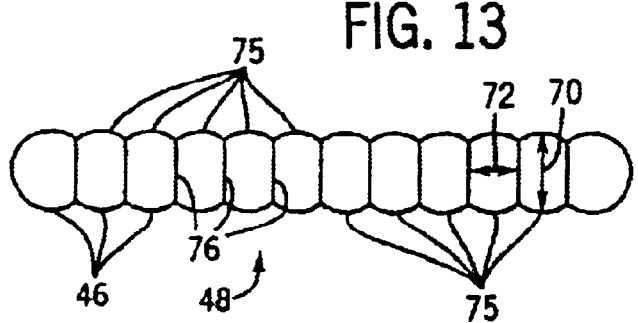

PARALLEL OPTICS SUBASSEMBLY HAVING AT LEAST TWELVE LENSES

FIELD OF THE INVENTION

The present invention relates generally to optoelectronic devices, and more specifically to parallel optics assemblies for use in fiber optic communications.

BACKGROUND OF THE INVENTION

The majority of computer and communication networks today rely on copper wiring to transmit data between nodes in the network. However, copper wiring has relatively limited bandwidth for carrying electrical signals which greatly constrains the amounts of data that it can be used to transmit.

Many computer and communication networks, including large parts of the Internet, are now being built using fiber optic cabling which has superior bandwidth capabilities and can be used to transmit much greater amounts of data. With fiber optic cabling, data is transmitted using optical or light signals (also called photonic signals), rather than with electrical signals. However, since computers use electrical signals as opposed to optical signals the light signals used to transmit data over fiber optic links must be translated to electrical signals and vice-versa during the optical communication process. Building such fiber optic networks therefore requires optoelectronic modules which mechanically and optically interface optical transmission mediums such as fiber optic cables to electronic computing and communications devices and transform optical signals to electronic signals and electronic signals to photonic signals. Further, in order to provide the required bandwidth for high-speed communications multiple fiber optic elements must be used in systems often referred to as "parallel optics" systems for concurrently transmitting multiple signals over a single cable. The optoelectronic modules must therefore also be adapted for accommodating cables having multiple fibers which are presented for connection purposes in closely spaced arrays of fiber optic elements supported in special ferrules attached to the ends of the cables.

Signal conversion from electrical to optical and optical to electrical may be provided for through the use of arrays of semiconductor elements (photoactive components) which are deployed on semiconductor or integrated circuit chips (optoelectronic devices). These photoactive components may be devices such as photodiodes which act as photo-receivers or laser diodes which act as photo-transmitters. While modules using such devices can provide satisfactory signal conversion performance, the building of effective parallel optics subassemblies is a challenge. The optical alignment of the photoactive devices with the ends of the thread-like fiber optic elements must be precise for an effective transfer of optical power. Since the fiber optic ends in parallel optics modules are closely spaced the complexity of this alignment task is further increased. Further, the module must be designed to efficiently handle the processing of the electrical signals and to efficiently interface with outside computer and communication systems.

One past alignment technique for use in constructing parallel optics modules was to etch alignment grooves along the surface of a silicon substrate using photolithography techniques. These grooves were then used in precisely positioning the fibers and fiber optic ends in aligned relationships to edge-emitting laser diodes. Although this technique can accurately align the optical components, the arrays must be manually assembled. Consequently, the process is labor intensive and results in low yields due to assembly errors and quality assurance problems.

More recently some parallel optics modules have come to use metal lead frames for mounting the photoactive devices. The lead frames then have alignment holes that cooperate with guide pins for alignment purposes. The guide pins extend from the holes in the lead frame to corresponding holes in a ferrule supporting the optic fibers in order to provide for the alignment of the ferrule with the lead frame and the fibers with the photoactive devices. However, for this design to be effective the optoelectronic device must be very accurately mounted onto the metal lead frame at the same time the alignment holes extending through the lead frame must be very accurately positioned. This alignment is hard to achieve and should the optoelectronic device or alignment holes be inaccurately positioned serious optical misalignment may occur even though the optical fibers may seem to be correctly aligned.

SUMMARY OF THE INVENTION

The present invention relates to parallel optics modules for use in fiber optic communications and more particularly to subassemblies for use in transmitting and receiving photonic (light) signals. Parallel optics modules provide for communications between computer and communication systems over fiber optic cables containing multiple fibers for carrying multiple concurrent signals. The subassembly of the present invention is adapted for interfacing between computer or communication systems and the ferrules on the ends of the fiber optic cables which are used to support and present the ends of the fiber optic elements.

The subassembly includes a receptacle, a lens and alignment frame, a carrier assembly and a casing structure for mounting and supporting these components. The carrier assembly includes a carrier frame section which is attached to the lens and alignment frame. An optoelectronic device comprising either an array of photoactive components such as either VCSELS for converting electrical signals to optical signals or PIN diodes for converting optical signals to electrical signals is mounted on the frame section. The lens and alignment frame includes a tower structure having a set of guide pins and an array of lenses precisely positioned with respect to the guide pins. The tower and guide pins are operative for providing accurate mechanical alignment between the lens and alignment frame and the ferrule as the guide pins mate with alignment holes in the ferrules and as the tower is fixed into a window in the inner end of the receptacle which helps position receptacle holding the ferrule with respect to the lens and alignment frame. The lenses are operative for accurately directing photonic signals through the lens and alignment frame between the fiber ends presented by the ferrule and the photoactive components of the optoelectronic device mounted on the carrier frame section. The lens and alignment frame functions to interface the fibers of the ferrule with the photoactive components of the optoelectronic device. The carrier assembly also includes one or more semiconductor chips for use in signal processing, a flex circuit section for a facilitating communications among its components and a small circuit board with an edge connector formed on one of its ends. The edge connecter is used to removably connect the subassembly to a jack which may be mounted on a circuit board in a computer or communications system. The carrier assembly also provides for the processing of the electrical signals and for the connection of the subassembly to a computer or communications system.

BRIEF DESCRIPTION OF THE DRAWINGS

The invention and its advantages may best be understood by reference to the following description taken in conjunction with the accompanying drawings in which:

FIG. 5 is a side view of the fiber optic communications module shown in FIG. 1 illustrating, among other things, the position of the carrier assembly within the subassembly and how the optoelectronic subassembly may be pluggably connected to a jack mounted on a printed circuit board of a communications system or the like;

FIG. 12 is an enlarged vertical sectional view around section line 12—12 of FIG. 10 illustrating the upper portions of the carrier frame section and lens and alignment frame in assembled form showing, among other things, the lens elements making up the lenses in the lens array and the alignment of the tower of the lens and alignment frame with the window in the back wall of the receptacle and the alignment of the lens elements with the optoelectronic device; and FIG. 13 is a plan view of the lens array and lens elements comprising the lenses of the lens array which is part of the lens and alignment frame showing the vertically elongated shaping of these lens elements and their deployment with respect to each other.

DETAILED DESCRIPTION OF THE INVENTION

The present invention will now be described in detail with reference to preferred embodiments as illustrated in the accompanying drawings. In the following description, numerous specific details are set forth in order to provide a thorough understanding of the present invention. However, it should be apparent to one skilled in the art that the present invention may be practiced without some or all of these specific details. In other instances it should be appreciated that well-known process steps have not been described in detail in order to not obscure the present invention.

Figure 1:
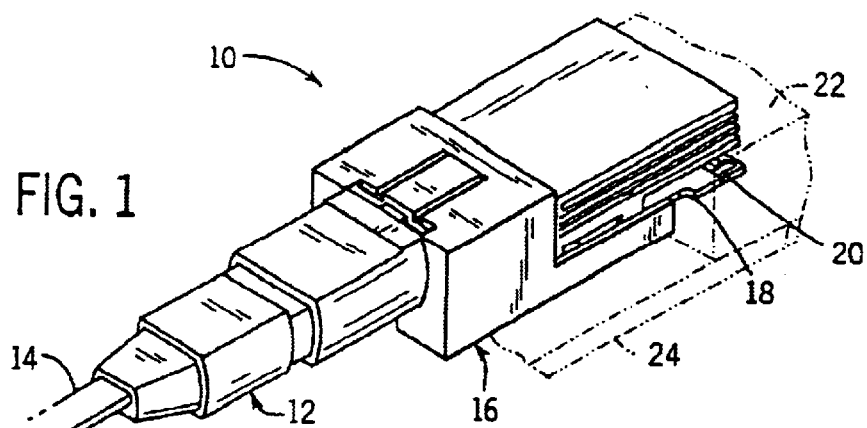
FIG. 1 is an overhead, perspective view of a fiber optic communications module constructed in accordance with the principles of the present invention showing a ferrule supporting optical communications fibers interconnected with an optoelectronic subassembly for use in converting optical signals to electrical signals or vice-versa.
Figure 2:
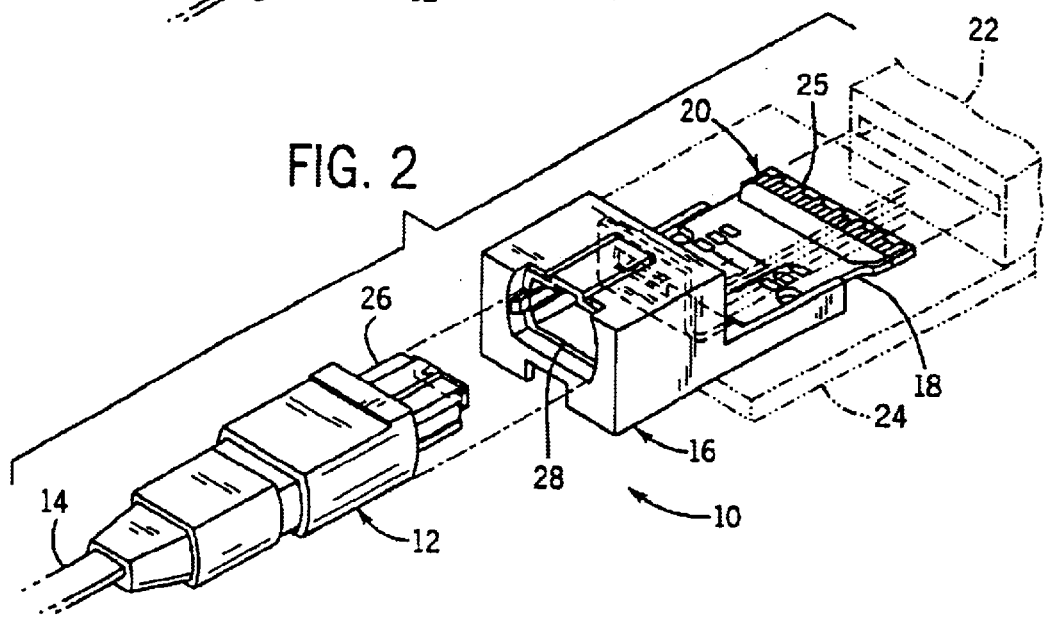
FIG. 2 is an overhead, perspective view of the fiber optics communications assembly shown in FIG. 1 with the ferrule disconnected from the subassembly and the subassembly unplugged from the jack to or from which it transfers electrical signals.

Referring now to FIGS. 1 and 2, a fiber optic connector assembly 10 is shown as comprising an optical ferrule 12 of the type sometimes referred to in the industry as an MT ferrule installed on the end of a cable 14 carrying multiple fiber optic communication elements 17 (not shown in FIGS. 1–2) and an optoelectronic subassembly 16 which operates as a transceiver module for either transmitting light (photonic) signals or receiving light signals and converting these signals to or from electrical signals. The subassembly 16 includes a small printed circuit board (PCB) 18 having an edge connector 20 with connection pads 25 on both sides which can be readily plugged into and out of an electrical connection jack 22 (in phantom) mounted on a circuit board 24 (in phantom) of a computer or communications system to or from which data can then be relayed over the cable 14 through the subassembly 16. The ferrule 12 and subassembly 16 are adapted for interconnection when the proximal end 26 of the ferrule 12 is inserted and latched within a cavity 28 in the subassembly 16. The ferrule 12 and subassembly 16 are then positioned and aligned so that optical signals can be transmitted either to or from the ferrule 12 and from or to the subassembly 16 for enabling data flow between the cable 14 and printed circuit board 24 (in phantom).

Figure 3:
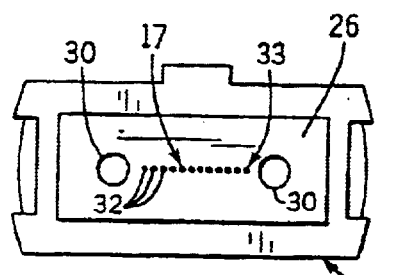
FIG. 3 is a front view of the ferrule shown in FIGS. 1–2, showing, among other things, the optical fiber ends and alignment holes.

Referring now to FIG. 3, the proximal end 26 of the ferrule 12 is shown which includes a pair of alignment holes 30 and a set of twelve optical communications fibers 17 having polished fiber ends 32. The fibers 17 and their polished ends 32 are rigidly supported within the ferrule 12. The fiber ends 32 are disposed in a linear array 33 at regular 250 micron intervals along a line extending between the alignment holes 30. The fiber ends 32 are precisely aligned with the holes 30.

Figure 4:
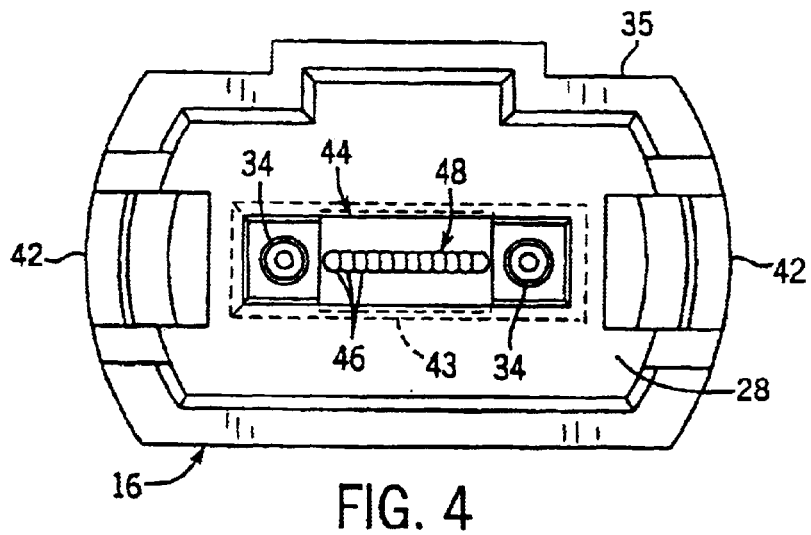
FIG. 4 is a front view of the optoelectronic subassembly shown in FIGS. 1–2 showing, among other things, the lens and alignment frame including the lens array and the guide pins.

Referring now to FIG. 4, the cavity 28 is defined by a receptacle 35 having jaws 42 for latching onto the ferrule 12. A pair of alignment or guide pins 34 and a set of twelve lenses 46 are disposed in a linear array 48 at regular 250 micron intervals along a line extending between the guide pins 34. The lenses 46 and guide pins 34 are part of a lens and alignment frame 44 which is deployed at the inner end of the cavity 28. As will be later described a set of twelve photoactive components 36 (not shown) are disposed behind the lenses 46 as part of an integrated circuit (IC) chip that comprises an optoelectronic is device 40 (not shown in FIG. 4). When the proximal end 26 of the ferrule 12 is latched into the cavity 28 by the jaws 42 the guide pins 34 in the subassembly 16 are engaged with the alignment holes 30 in the ferrule 12 which in turn precisely aligns the lenses 46 in the array 48 (and photoactive components 36 behind the lenses) with the fiber ends 32 in the array 33 so that photonic signals can pass between them.

Figure 5:
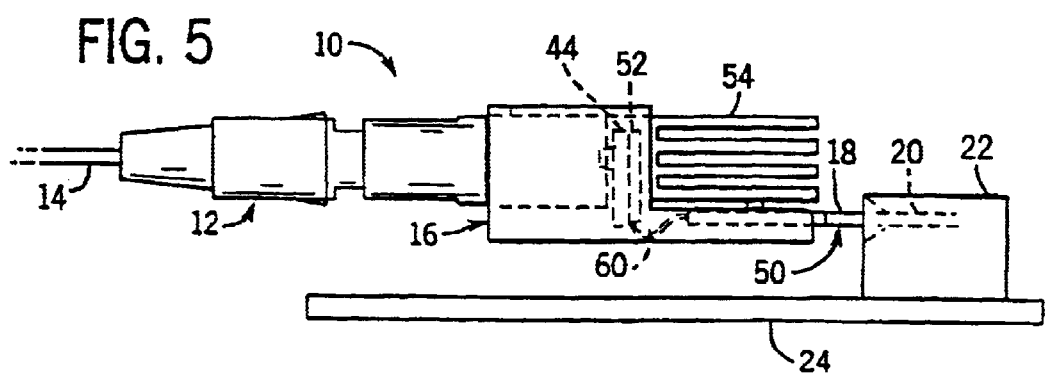

Referring now to FIG. 5, the parallel optics assembly 10 is shown with the ferrule 12 latched into the subassembly 16 and with the edge connector 20 (in phantom) plugged into the jack 22 so that the pads 25 are in electrical contact with the elements of a connector lead frame (not shown) within the jack 22. The jack 22 is surface mounted on the circuit board 24 and thereby electrically interconnected with the circuitry on the board 24 and the computer or communication system of which the board is a part. The edge connector 20 and jack 22 enable the subassembly 16 to be removably connected to the board 24. The subassembly 16 includes a carrier assembly 50 (mostly in phantom) which has a planar carrier frame section 52 at one end which is sandwiched in between the ferrule 12 and a heat sink 54 along with the lens and alignment frame 44. The lens and alignment frame 44 is positioned between the carrier frame section 52 and the ferrule 12 and acts as an interface between them and the components supported in or mounted on them. The carrier assembly 50 also includes a flex circuit 60 (in phantom) which is bendable and which also serves as an integral part of both the frame section 52 and the circuit board 18. The flex circuit 60 extends under the heat sink 54 from the carrier frame section 52 at its one end to the circuit board 18 at its opposite end.

Figure 6:
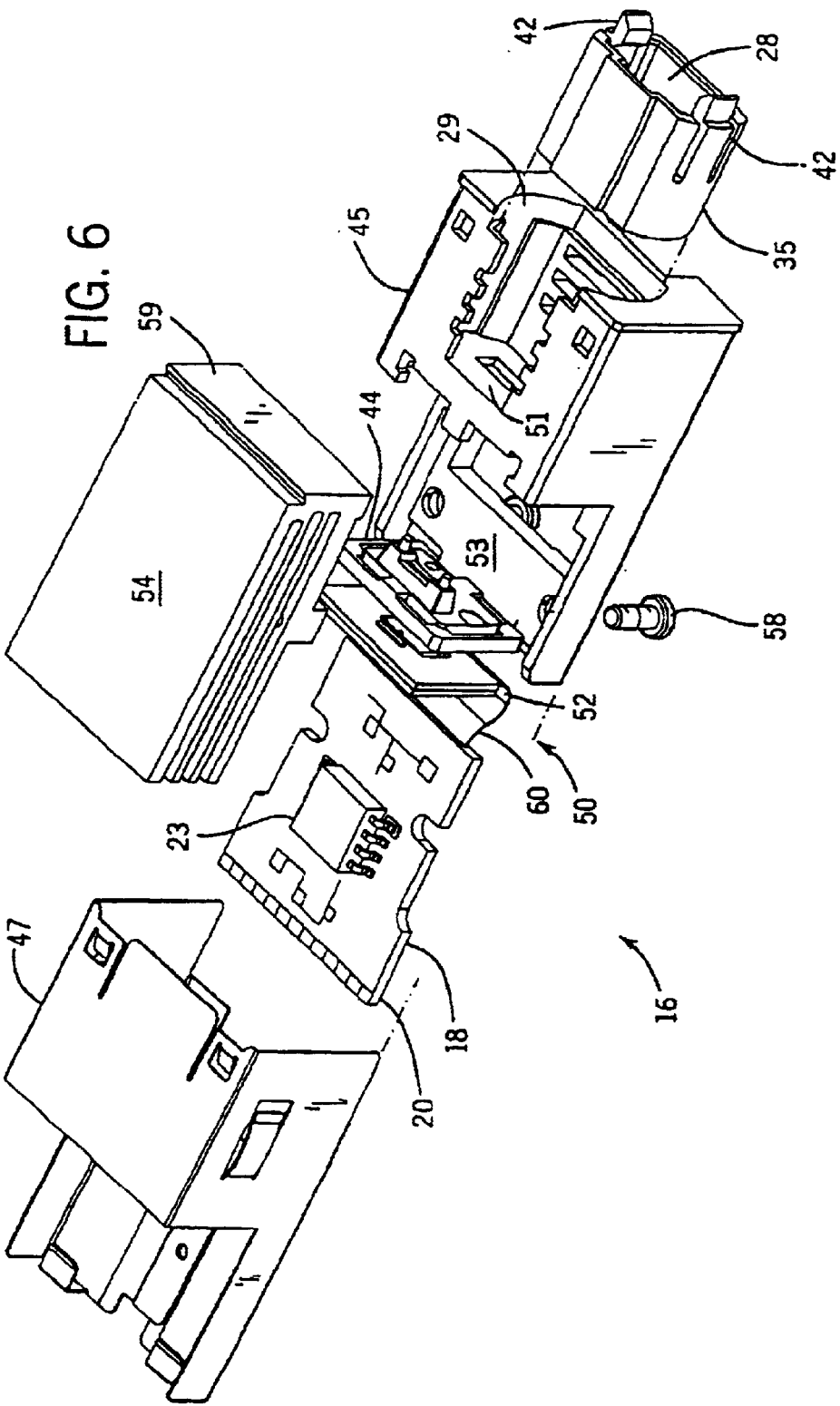
FIG. 6 is an exploded, overhead perspective view of the subassembly of the present invention showing, among other things, how the casing structure, receptacle, lens and alignment frame, carrier frame section, circuit board, edge connector and the other components of the optoelectronic subassembly relate to one another.
Figure 7:
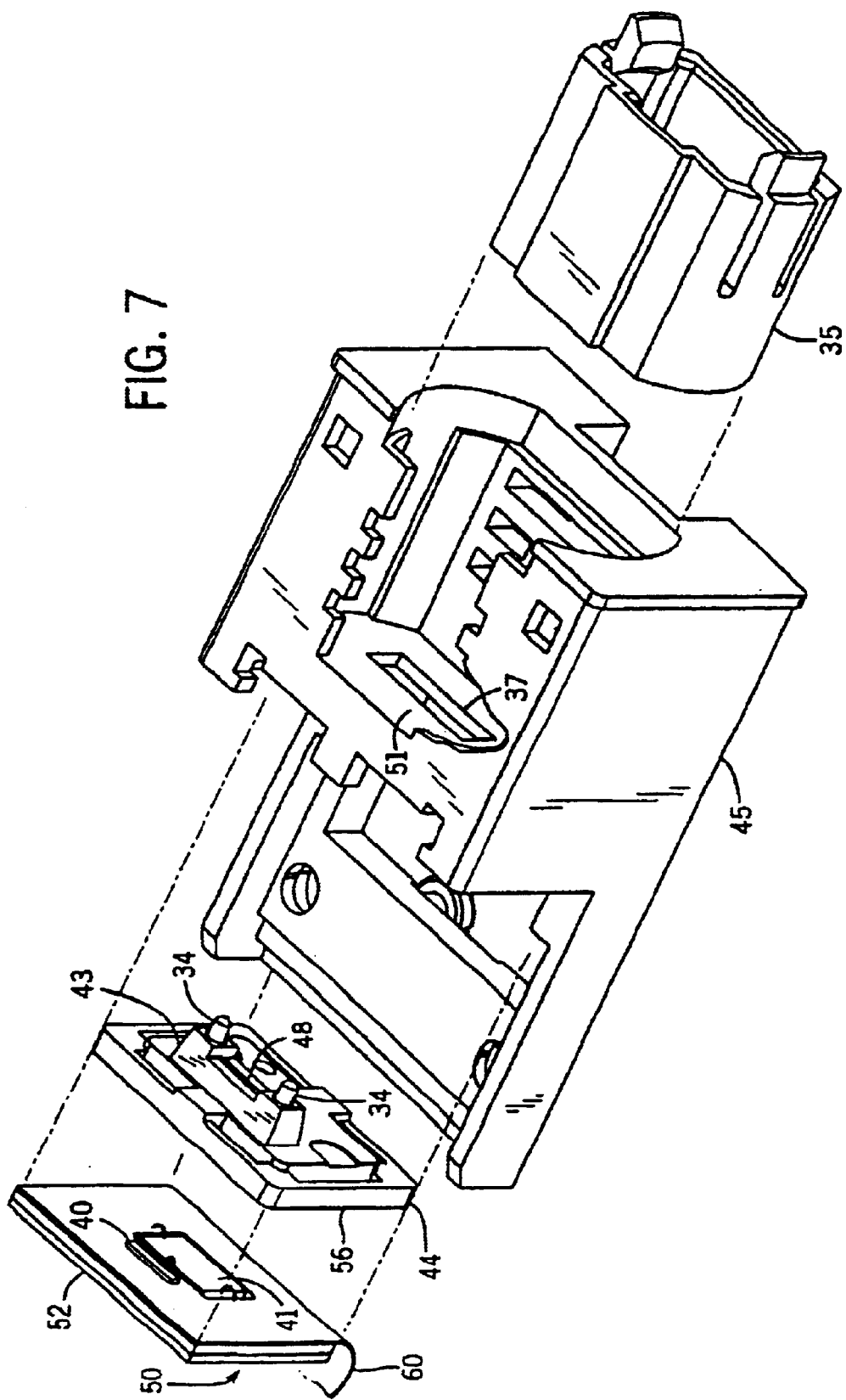
FIG. 7 is an enlarged exploded, overhead perspective view of the front portion of the subassembly of the present invention showing, among other things, how the casing structure, receptacle, lens and alignment frame, and carrier frame section relate to one another.

Referring now to FIGS. 6 and 7, the subassembly 10 includes the receptacle 35, metal casing structure 45, lens and alignment frame 44, carrier assembly 50, heat sink 54 and casing structure 47. As previously explained the receptacle 35 is adapted for receiving the ferrule 12 in the cavity 28. The receptacle is mounted in the recess 29 in the casing structure 45 so that it abuts the back wall 51 of the recess 29. The carrier assembly 50 includes the printed circuit board 18, the flex circuit 60 and the carrier frame section 52. The lens and alignment frame 44 is mounted in between the frame section 52 of the carrier assembly 50 and the back wall 51 of the casing structure 45 so that it is immediately adjacent to the fiber ends 32 on the proximal end 26 of the ferrule 12 when the ferrule is latched into the subassembly 16. The flex circuit 60 connects the frame section 52 to the circuit board 18 serving as a medium for providing a large number of connection lines between components on the carrier frame section 52 and the circuit board 18 including the microcontroller chip 23 and the edge connector 20. The circuit board 18 fits along the back shelf 53 of the casing structure 45 underneath the heat sink 54. The front end 59 of the heat sink 54 abuts the backside of the carrier frame section 52 for dissipating heat generated during operation by the electrical components mounted onto the frame section 52. Except for the heat sink, the metal cover 47 first around the subassembly 16 providing a covering and protection for the receptacle 35, casing structure 45 and the components of the carrier assembly 50 including the circuit board 18 extending along the back shelf 53 of the casing structure 45. The bolts 58 help retain the heat sink 54 and circuit board 18 in position.

A shown more clearly in FIG. 7, the casing structure 45 includes a window 37 in its back wall 51. The lens and alignment frame 44 includes a mostly planar base 56 and a rectangular tower structure 43 projecting forward of the base 56 on which the guide pins 34 and the lens array 48 are mounted. The tower 43 of the lens and alignment frame 44 fits through the window 37 of the casing structure 45 in the assembled device. The lens and alignment frame 44 is a one-piece precision plastic injection-molded part including the tower 43, guide pins 34 and lens array 48. The frame section 52 of the carrier assembly 50 preferably includes one or more layers of printed circuit board material including a layer of flex circuit material 61 which is an extended part of the flex circuit 60. The optoelectronic device 40 is precisely mounted on the frame section 52 and includes the photoactive semiconductor components 36 which are deployed on and as part of an integrated circuit (IC) chip that comprises an optoelectronic device 40. The photoactive components 36 may be either semiconductor transmitter elements or semiconductor receiver elements and are disposed in a linear array 38 at regular 250 micron intervals corresponding to the linear array 48 of the lenses and the linear array 33 of the fibers. When the lens and alignment frame 44 is mounted on the frame section 52 the optoelectronic device 40 and photoactive components 36 are precisely aligned with the lens array 48 and the guide pins 34. If the photoactive elements 36 are intended to be transmitter elements (a transmitter subassembly) they may, for example, be light emitting diodes (LEDs) or laser diodes. They are preferably vertical cavity surface-emitting lasers (VCSELs). If the photoactive elements 36 are intended to be receivers elements (a receiver subassembly) they may, for example, be PIN photodiodes or avalanche photodiodes (APDs) although they are preferably PIN photodiodes. One or more signal processing chips 41 may be mounted on the frame section 52 for communicating with the optoelectronic device 40 and more particularly providing drive signals to transmitter elements or providing signal amplification and conditioning in the case of receiver elements.

Figure 8:
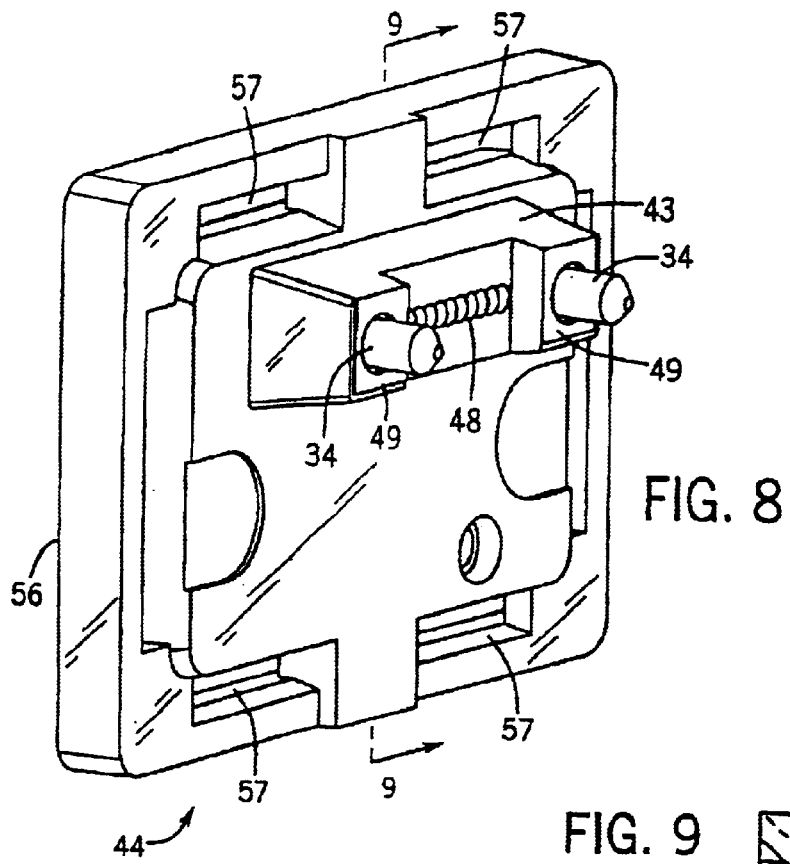
FIG. 8 is a perspective view of the lens and alignment frame component of the present invention showing, among other things, the tower structure and the lens array and guide pins which are built into the tower structure.
Figure 9:
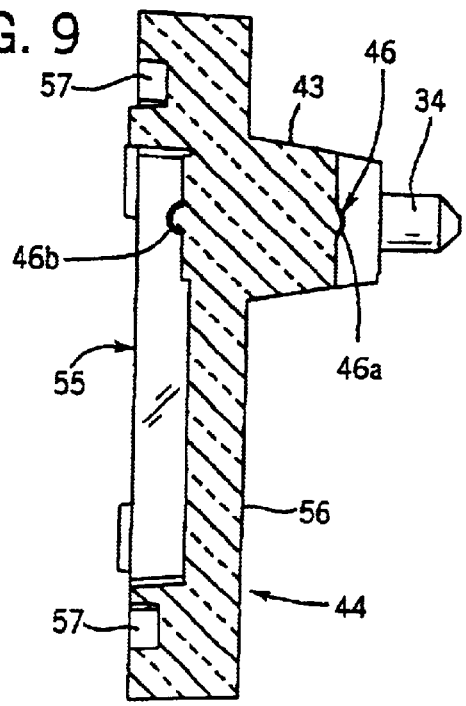
FIG. 9 is a vertical cross sectional view of the lens and alignment frame of the present invention taken along section line 9—9 of FIG. 8 showing again, among other things, the arrangement of the tower structure, lens array and guide

Referring now to FIGS. 8 and 9, the lens and alignment frame 44 includes a main body or base 56 and a tower 43. The base 56 is mostly planar and includes cavities 57 into which adhesive materials can flow during mounting and a large but shallow recess 55 for accommodating components and wiring on the front side of the carrier frame section 52 on which the lens and alignment frame 44 is mounted. The tower 43 resides on the front side of the frame section 52 and projects well forward of the base 56. The tower 43 includes a pair of turret-like elevated end sections 49 on top of which the guide pins 34 are mounted so as to project outward and forward from the base 56 and lens array 48. The lenses 46 in the array 48 are deployed at regular 250 micron intervals along a line extending between the elevated end sections 49 and guide pins 34 in a manner corresponding to the arrangement of the photoactive components 36 of the optoelectronic device 40 and fibers 17 of the ferrule 12. The lenses 46 are precisely aligned with the guide pins 34. Each lens 46 in the array 48 includes a front lens element 46a and a rear lens element 46b for directing light to and from the fiber ends 32 and photoactive components 36, respectively. As shown in FIGS. 4 and 13, the lens array 48 includes twelve lenses 46.

Figure 10:
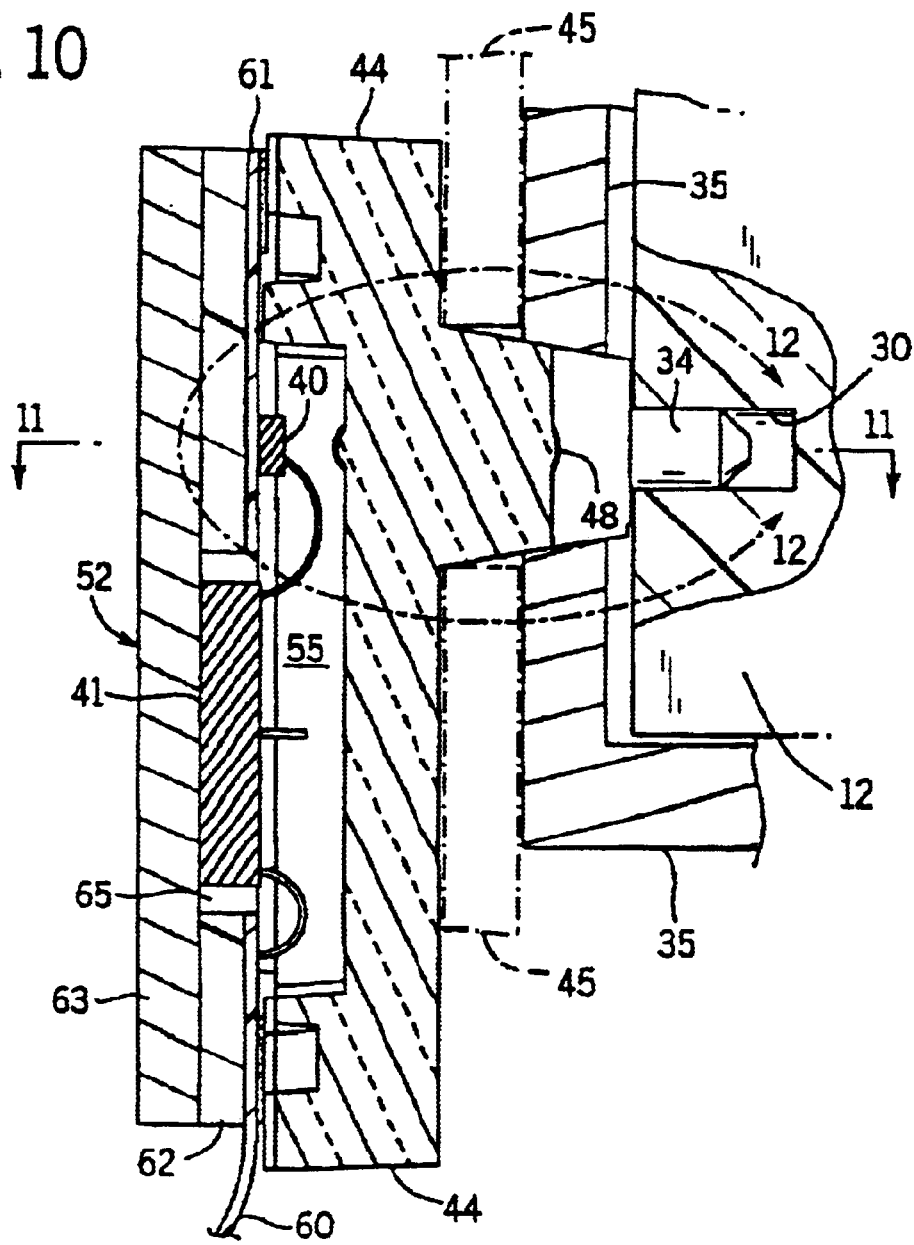
FIG. 10 is a vertical sectional view of the carrier frame section, lens and alignment frame, receptacle (inner end) and ferrule (proximal end) in assembled form showing, among other things, the vertical alignment of the ferrule with the lens and alignment frame and the carrier frame section and the alignment of the lens array with the optoelectronic device.

Referring now to FIGS. 10 and 14, the lens and alignment frame 44 is precisely mounted on the carrier frame section 52 and cooperates with the receptacle 35 in achieving alignment with the ferrule 12. The frame section 44 is mounted flush on the front side of the frame section 52 using epoxy adhesive so as to carefully center the lens array 48 over the optoelectronic device 40 and more particularly the array 38 of photoactive components 36 which comprises the optoelectronic device 40. The recess 55 in the frame 44 provides space to accommodate the chips 40 and 41 and to accommodate the wire bonds whereby the chips 40 and 41 are interconnected and connected to the signal traces on the flex circuit 60 part of the carrier assembly 50. The frame section 52 preferably includes a flex circuit layer 61, a layer of FR-4 printed circuit board material and a thin layer 63 of copper plate. The signal processing chip 41 may then be mounted in a small well 65 in the flex circuit layer 61 and circuit board layer 62 of the frame section 52 so that it is in direct contact with the copper layer 63 to improve heat dissipation in connection with the operation of the heat sink 54 which is attached to the layer 63 on the backside of the frame section 52. The tower 43 passes through the window 37 in the casing structure 47 and fits into a second window 31 in the back wall at the inner end of the receptacle 35 which assists in making sure that the receptacle is aligned with the frame 44 and the frame section 52 and ferrule 12 are then aligned as the ferrule 12 is latched into the receptacle 35. The guide pin 34 of the lens and alignment frame 44 fits into the alignment hole 30 in the ferule 12 for precisely aligning the array 33 of optical fibers 17 (not shown in FIG. 10) with the lens array 48.

Figure 11:
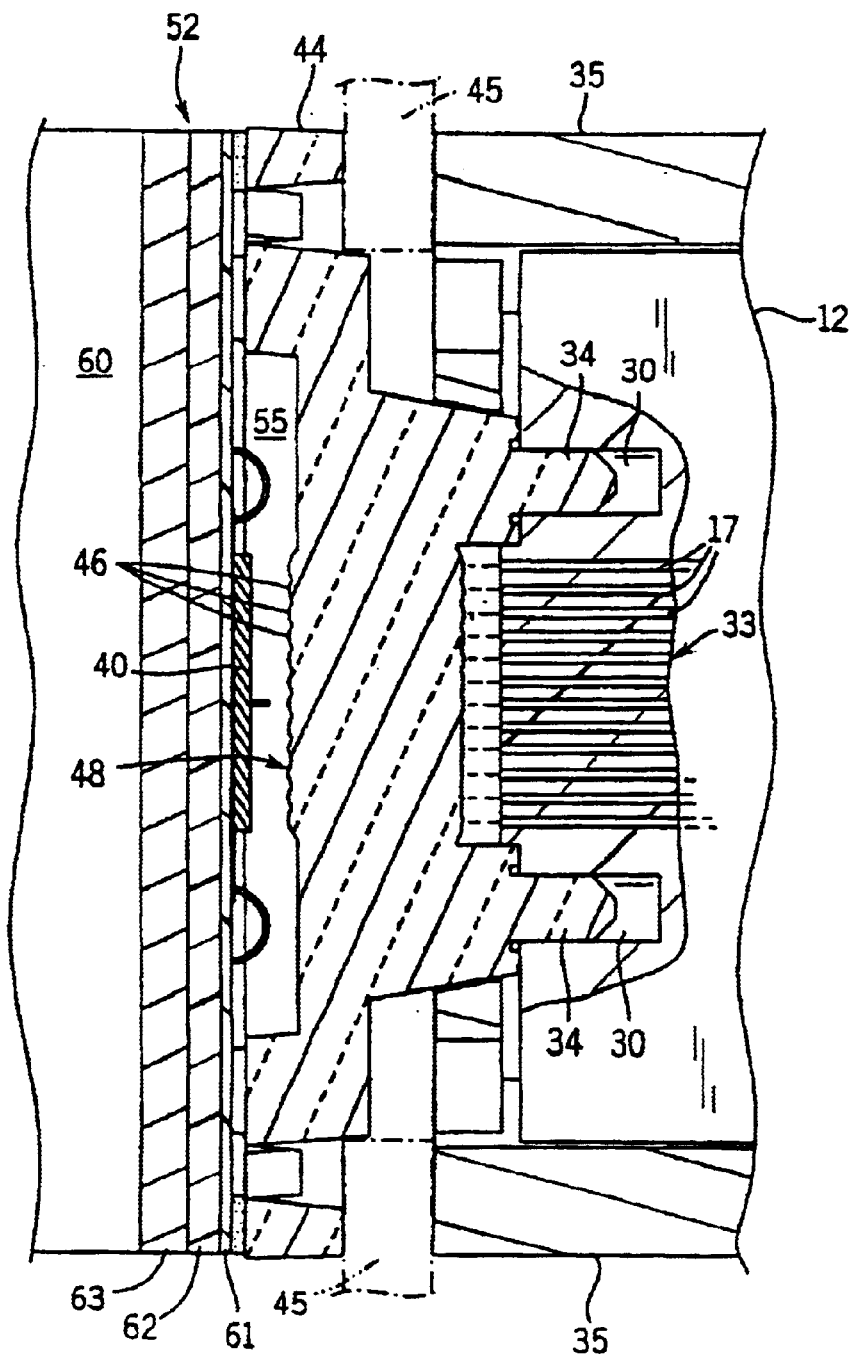
FIG. 11 is a lateral sectional view of the carrier frame section, lens and alignment frame, receptacle (inner end) and ferrule (proximal end) in assembled form showing, among other things, the lateral alignment of the ferrule with the lens and alignment frame and the carrier frame section and the alignment of the optical fibers with the lens array and the optoelectronic device.

Referring now to FIG. 11, it can seen again that the lens and alignment frame 44 is mounted on carrier frame section 52 so that the array 48 of lenses 46 is aligned with the optoelectronic device 40 and accordingly with the linear array 38 of photoactive components 36 which comprise the optoelectronic device 40. The ferrule 12 is in turn coupled to the lens and alignment frame 52 by the action of the guide pins 34 which closely fit into the alignment holes 30 when the ferrule is inserted and latched into the receptacle 35 of the subassembly 16. Since the lens array 48 and fiber array 33 are accurately positioned with respect to the guide pins 34 and alignment holes 30, the guide pins and alignment holes 30 are operative for aligning the array 33 of optical fibers 17 with the array 48 of lenses 46. The lens and interface frame 44 thereby provides for the alignment of the array 33 of fibers 17 with the array 48 of lenses 46 and with the optoelectronic device 40 and more particularly with the array 38 (not shown) of photoactive components 36 (not shown) in the optoelectronic device 40. The alignment of the fibers 17 with the lenses 46 and the photoactive components of the optoelectronic device 40 (semiconductor chip) enables the transmission of photonic (light) signals from the optoelectronic device 40 to the fibers 17 in a transmitter subassembly 16 or from the fibers 17 to the optoelectronic device 40 in a receiver subassembly 16. The lens and alignment platform 44 also serves to fix the distances over which light is focused by the lenses 46. These distances are established by the offsets from the lenses 46 in the frame 44 to the frame section 52 and optoelectronic device 40 one side (across the recess 55) and to the ferrule 12 and fibers 17 on the other side.

Referring now to FIG. 12, the lenses 46 are biconvex in shape and are each comprised of two planoconvex lens elements 46a and 46b on the front and back sides of the central section of the tower 43 of the lens and alignment frame 44 between the elevated end sections. Also referring again to FIG. 11, the individual lenses 46 are operative for directing light to and from the individual fibers 17, through the lens and alignment frame 44 and to and from the individual photoactive components in the optoelectronic device 40. The lens elements 46a are adapted for focusing light to and from the fibers 17 while the lenses elements 46b are adapted for focusing light to and from the optoelectronic device 40. In the preferred embodiment the lens elements 46a and 46b making up the lenses 46 may, by way of example, be characterized by the values shown in TABLE I.

TABLE I

| Lens Element Key Parameter Values | | |
|---|---|---|
| | LENS 1 (46b) | LENS 2 (46a) |
| N (index) (um) | 1.632 | 1.632 |
| D (focus) (um) | 300 | 450 |
| k | −2.663424 | −2.663424 |
| R (radius at apex) | 189.6 | 284.4 |
| half aperture (um) | 200 | 200 |
| z (sag) (um) | 78.47245944 | 59.84856468 |
| LENS 1 | element 46b | Device side |
| LENS 2 | element 46a | Fiber side |

| Lens Element Sag Values | | |
|---|---|---|
| | LENS 1 | LENS 2 |
| r (um) | z (um) | z (um) |
| 50 | 6.412449 | 4.340131 |
| 100 | 23.87155 | 16.75945 |
| 150 | 48.86220 | 35.80733 |
| 200 | 78.47245 | 59.84856 |

The lens elements 46a (fiber side) have a focal length D of about 450 microns and the lens elements 46b (device side) have a focal length D of about 300 microns with the fibers 17 and optoelectronic device 40 then being positioned at or near the focal points of these lens elements. However, the fibers 17 may be preferably positioned away from the focal points by about 100–200 microns toward the lens element 46a. This may allow the for some of the light emitted in transmitter subassemblies at higher off-axis angles by transmitter components 36 such as VCSELs which is subject to slower modulation patterns to be focused (or rather defocused) away from the fiber ends 32 of the fibers 17. The optimal amount of defocusing depends on the numerical aperture values of the VCSELS and the fibers.

Referring now to FIG. 13, the lenses 46 are collinearly and contiguously positioned in the lateral direction from end to end across the array 48. The lenses 46 are characterized by a vertically elongated shape and have a greater height than width. The lenses 75 on the interior of the array 48 are about 400 microns high in the vertical direction 70 and are about 250 microns wide in the lateral direction 72. The lenses 46 intersect along extended common boundaries 76 extending out from the centerline of the array 48 by about 156 microns with each boundary measuring about 312 microns in total length. The lenses 46 are in effect truncated in the lateral direction at their boundaries 76. In effect the lenses 46 are extended vertically and are larger than the natural 250 micron pitch (center-of-lens to center-of-lens distance) of the array 48. The elongated lenses 46 provide improved light gathering characteristics and improved tolerance to mechanical misalignments affecting optical coupling efficiency as compared to smaller symmetrically shaped lens designed to intersect at a point along the centerline of the array 48.

Although only a few embodiments of the present invention have been described in detail, it should be understood that the invention may be embodied in other forms without departing from its overall spirit or scope.

We claim:

1. A parallel optics subassembly for mating with a ferrule supporting an array of optical fibers adapted for carrying digital signals and having a set of alignment holes positioned in a precisely spaced relationship with said array of optical fibers, the parallel optics subassembly comprising:

a) a receptacle for guiding and latching said ferrule into position including a window at the inner end of the receptacle;

b) a carrier assembly for supporting an optoelectronic device having an array of photoactive components, the carrier assembly includes a flex circuit and a printed circuit board, the flex circuit is electrically connected to the optoelectronic device and to the printed circuit board, the printed circuit board includes an electricsl edge connector for removeably connecting the parallel optics subassembly to a computer or communications system; and c) a lens and alignment frame defining an optical and mechanical interface between said ferrule and said carrier assembly which is mounted on said carrier assembly in a precisely positioned relationship with said optoelectronic device, said lens and alignment frame including:

an array of lenses for focusing light between said array of optical fibers and said array of photoactive components, each lens of the array of lenses being truncated in a lateral direction so as to have a height dimension and a width dimension, the height dimension being greater than the width dimension, each lens of the array of lenses having common boundaries with adjacent lenses of the array of lenses which are contiguously positioned in a linear array, and wherein a first lens of the array of lenses is separated from a second lens of the array of lenses by a first interval, and wherein the first interval is substantially equal to 250 microns, and wherein the array of lenses includes twelve lenses, a tower extending outward from said lens and alignment frame for engaging said window in said receptacle and helping to position said receptacle with respect to said lens and alignment frame, and wherein said tower has a rectangular base and includes a pair of elevated sections located on opposing ends of said tower, and wherein the window in the receptacle is rectangular and the tower is rectangularly shaped so as to mate with the window, and a set of guide pins projecting from and forward of said tower for mating with said alignment holes on said ferrule and positioning said ferrule with respect to said lens and alignment frame and optoelectronic device, and wherein said set of guide pins are mounted on the pair of elevated sections, and wherein the array of lenses extend between each elevated section of the pair of elevated sections.

2. A parallel optics subassembly for mating with a ferrule supporting an array of optical fibers adapted for carrying digital signals and having a set of alignment holes positioned in a precisely spaced relationship with said array of optical fibers, the parallel optics subassembly comprising:

a) a receptacle for guiding and latching said ferrule into an interconnected position with said parallel optics subassembly;

b) a carrier assembly for supporting an optoelectronic device having an array of photoactive components; and c) a lens and alignment frame defining an optical and mechanical interface between said carrier assembly and said ferrule which is attached to said carrier in a precisely spaced relationship with said optoelectronic device, the lens and alignment frame including:

a tower extending outward from said lens and alignment frame including a set of elevated end sections, the tower includes a rectangular base, and each elevated end section of the set of elevated end sections are located on opposing ends of the rectangular base, and wherein the receptacle includes a rectangular window at an inner end of the receptacle for mating with the tower and helping to position the receptacle with respect to the lens and alignment frame so that the ferrule is accurately positioned with respect to the lens and alignment frame and carrier assembly, an array of lenses mounted on said tower in between each elevated end section of said set of elevated end sections for focusing light between said array of optical fibers and said array of photoactive components, and each lens of the array of lenses being truncated in a lateral direction so as to have a height dimension and a width dimension, the height dimension being greater than the width dimension, each lens of the array of lenses having common boundaries with adjacent lenses of the array of lenses which are continuously positioned in a linear array, and wherein a first lens of the array of lenses is separated from a second lens of the array of lenses by a first interval, and wherein the first interval is substantially equal to 250 microns, and wherein the array of lenses includes twelve lenses, and a set of guide pins projecting forward from said set of elevated end sections on said tower for mating with said alignment holes on said ferrule and positioning said ferrule with respect to said lens and alignment frame and optoelectronic device.

3. A parallel optics subassembly for mating with a ferrule supporting an array of optical fibers adapted for carrying digital signals and having a set of alignment holes positioned in a precisely spaced relationship with said array of optical fibers, the parallel optics subassembly comprising:

a carrier assembly including a frame section for supporting an integrated circuit chip having an array of photoactive components;

a receptacle for guiding and latching the ferrule into position with the parallel optics subassembly, the receptacle including a window at an inner end of the receptacle; and a lens and alignment frame for defining an optical and mechanical interface between said carrier assembly and said ferrule which is attached to said carrier assembly in a precisely spaced relationship with said photoactive components, said lens and alignment frame including:

a tower extending outward from said lens and alignment frame including, a pair of elevated end sections, an array of lenses for focusing light between said photoactive components and said array of optical fibers, and the array of lenses being mounted between each elevated end section of the pair of elevated end sections, each lens of the array of lenses being truncated in a lateral direction so as to have a height dimension and a width dimension, the height dimension being greater than the width dimension, each lens of the array of lenses having common boundaries with adjacent lenses of the array of lenses which are contiguously positioned in a linear array, and wherein a first lens of the array of lenses is separated from a second lens of the array of lenses by a first interval, and wherein the first interval is substantially equal to 250 microns, and wherein the array of lenses includes twelve lenses, and a set of guide pins projecting forward of said tower for mating with said set of alignment holes on said ferrule, and the set of guide pins being mounted on the pair of elevated end sections.

4. A parallel optics subassembly for mating with a ferrule supporting an array of optical fibers adapted for carrying digital signals and having a set of alignment holes positioned in a precisely spaced relationship with said array of optical fibers, the parallel optics subassembly comprising:

a) a receptacle for guiding and latching said ferrule into position including a window at an inner end of the receptacle;

b) a carrier assembly including a frame section for supporting an optoelectronic device having an array of photoactive components, a flex circuit for providing electrical interconnections, and a printed circuit board;

c) an electrical edge connector on one edge of said printed circuit board for pluggably interconnecting said parallel tics subassembly with a jack mounted on a circuit board of a computer or a communications system; and d) a lens and alignment frame for defining a mechanical and optical interface between said ferrule and said carrier assembly which is attached to said carrier assembly in a precisely spaced relationship with said photoactive components, said lens and alignment frame including:

a tower extending outward from said lens and alignment frame for engaging said window in order to help position said receptacle with respect to said lens and alignment frame, a set of guide pins projecting forward of said tower for mating with said alignment holes on said ferrule in order to position said ferrule and the array of optical fibers with respect to said lens and alignment frame, the carrier assembly, and the photoactive components, and an array of lenses for focusing light between said photoactive components and said array of optical fibers, each lens of the array of lenses being truncated in a lateral direction so as to have a height dimension and a width dimension, the height dimension being greater than the width dimension, each lens of the array of lenses having common boundaries with adjacent lenses of the array of lenses which are contiguously positioned in a linear array, and wherein a first lens of the array of lenses is separated from a second lens of the array of lenses by a first interval, and wherein the first interval is substantially equal to 250 micron, and wherein the array of lenses includes twelve lenses.

* * * * *